United States Patent [19]

Kazino et al.

[11] Patent Number: 5,073,073
[45] Date of Patent: Dec. 17, 1991

[54] SELF-ALIGNING BOLT AND A SELF-ALIGNING NUT

[75] Inventors: Hiroshi Kazino, Komaki; Takahiko Ito, Ichinomiya, both of Japan

[73] Assignee: K.K. Aoyama Seisakusho, Nagoya, Japan

[21] Appl. No.: 423,882

[22] Filed: Oct. 19, 1989

[30] Foreign Application Priority Data

Oct. 19, 1988 [JP] Japan .................. 63-263572

[51] Int. Cl.⁵ .................. F16B 25/00; F16B 37/16
[52] U.S. Cl. .................. 411/386; 411/426; 411/436
[58] Field of Search .............. 411/238, 427, 436, 386, 411/417, 426, 437

[56] References Cited

U.S. PATENT DOCUMENTS

| 1,627,745 | 5/1927 | Madden | 411/238 |
| 2,167,910 | 8/1939 | Rottenburg | 411/386 |
| 2,301,634 | 11/1942 | Nicholay | 411/238 |
| 3,724,315 | 4/1973 | Sygnator | 411/386 |
| 3,978,760 | 9/1976 | Muenchinger | 411/386 |
| 4,789,288 | 12/1988 | Peterson | 411/386 |
| 4,907,930 | 3/1990 | Peterson | 411/427 |

Primary Examiner—Neill R. Wilson
Attorney, Agent, or Firm—Cushman, Darby & Cushman

[57] ABSTRACT

A self-aligning bolt has an eccentric pilot tip extending forwardly of the externally threaded shank thereof. A self-aligning nut has an eccentric counter-bore formed therein on the side of the seating face and offset from the axis of the internally threaded bore of the nut.

3 Claims, 3 Drawing Sheets

SELF-ALIGNING BOLT AND A SELF-ALIGNING NUT

This invention relates to a self-aligning bolt and a self-aligning nut capable of being tightened while performing self-alignment with a conventional nut or bolt.

BACKGROUND OF THE INVENTION

An automatic machine such as a nut runner is employed for engagement of a bolt or nut with a corresponding nut or bolt. If there is a misalignment between the axes of the bolt and the nut, seizing will take place between the bolt and nut during their tightening. In order to eliminate this disadvantage, it has been proposed heretofore that a tapered guide is formed at the tip of a bolt or at the edge of the threaded bore of a nut on the side of its seating face to pilot the bolt into the threaded bore of a nut or the threaded bore of the nut onto a bolt. This arrangement does not provide any piloting effect in the event that a misalignment between the bolt and the nut is significant.

An object of the invention is to provide a self-aligning bolt and a self-aligning nut capable of being tightened while effectively performing self-alignment with a conventional nut or bolt even if there is a significant misalignment between the bolt and the nut.

SUMMARY OF THE INVENTION

The aforementioned object of the invention can be achieved by providing a self-aligning bolt having its externally threaded shank followed by an eccentric pilot tip.

In accordance with the invention, there is also provided a self-aligning nut having its centrally internally threaded bore formed therein and an eccentric counter bore formed in the nut on the side of its seating face.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

Figure 1:
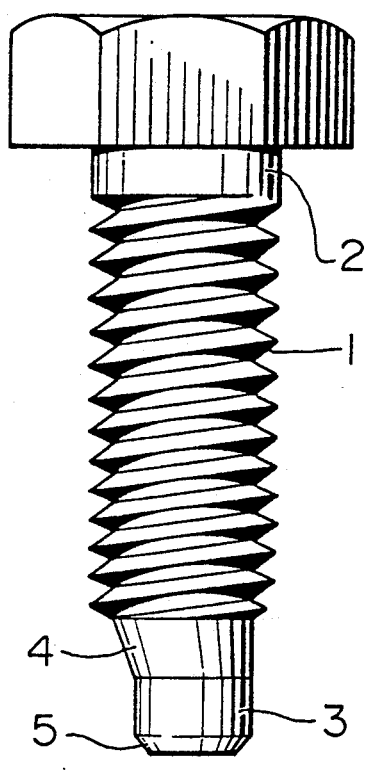
FIG. 1 is a side elevational view of a self-aligning bolt embodying the invention.
Figure 2:
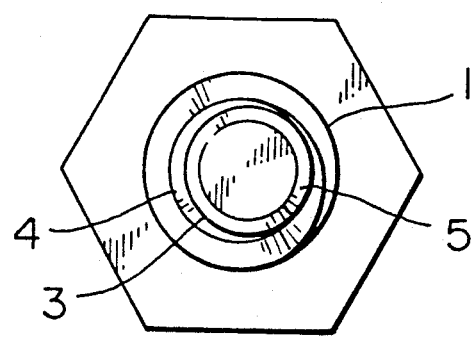
FIG. 2 is a bottom plan view of the self-aligning bolt.

Referring now to FIGS. 1 and 2 of the drawings, there is shown a self-aligning bolt made in accordance with the invention, the self-aligning bolt comprising an externally threaded shank 2 and a pilot tip 3 extending forwardly of the threaded shank 2. The pilot tip 3 is positioned such that it lies internally tangent to the circle defined by the root diameter of the threads 1 of the shank 2 and has its center offset from the axis of the threaded shank 2 by a predetermined amount, as can be seen in FIG. 2. The pilot tip 3 preferably includes an intermediate portion 4 smoothly connected to the threaded shank 2 and has a chamfer 5 formed at the edge thereof to facilitate entering internal threads.

Figure 3:
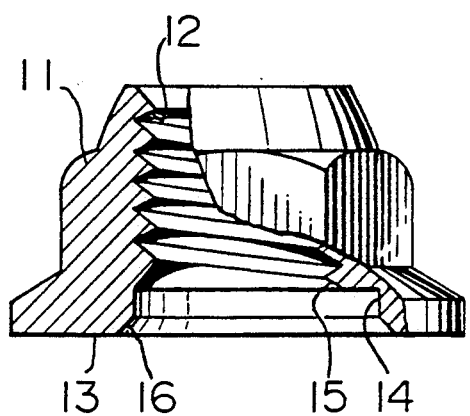
FIG. 3 is a side elevational view, partially in section, illustrating a self-aligning nut embodying the invention.
Figure 4:
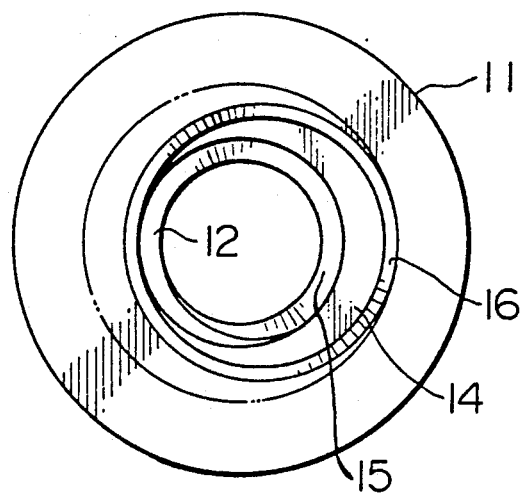
FIG. 4 is a bottom plan view of the self-aligning nut.

FIGS. 3 and 4 of the drawings show a self-aligning nut made in accordance with the invention, wherein a nut body 11 has an internally threaded bore 12 formed therein. The nut body 11 is formed with a pilot counter-bore 14 on the side of the seating face 13 thereof, the pilot counter-bore 14 having a larger diameter than the root diameter of the internal threads 12. The pilot counter-bore 14 is positioned such that it lies externally tangent to the circle defined by the root diameter of the internal threads 12 and has its center offset from the axis of the nut by a predetermined amount. A guide surface 15 is preferably formed between the end of the threaded bore and the counter-bore 14 and a chamfer 16 is preferably formed at the edge of the counter-bore 14 on the side of the seating face of the nut so that the tip of a bolt facilitates entering the threaded bore 12 and the counter-bore 14 of the nut body 11.

Figure 5:
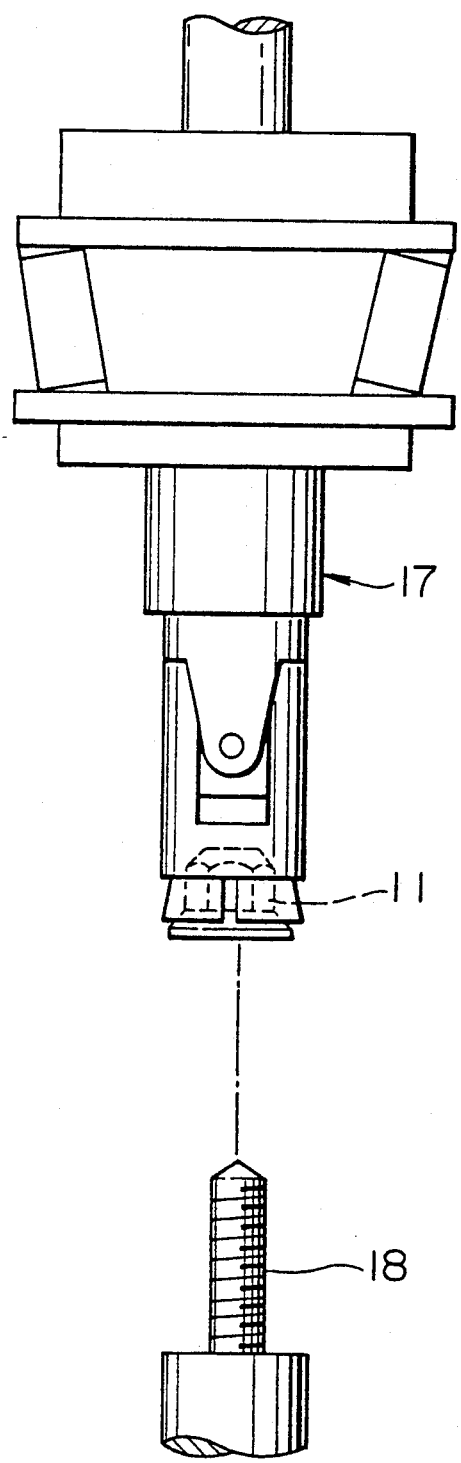
FIG. 5 is a side elevational view of a nut runner holding the self-aligning nut to be engaged by a bolt.

As can be seen in FIG. 5, a runner 17 which is preferably flexibly attached through a remote center compliance device to a robot handle, is employed to hold the self-aligning nut according to the invention for its engagement with a bolt 18. The nut runner 17 is provided with a chuck, by means of which the nut body 11 is held, and is actuated to turn the nut body 11 about its central axis while advancing it toward the bolt 18. During turning of the nut, its eccentric counter-bore 14 is also moved around the axis of the threaded bore as indicated by a phantom circular line in FIG. 4. Insofar as the tip of the bolt 18 is located within the area defined by the phantom circular line, it is received into the eccentric counter-bore 14 of the nut during its rotation. The rotary movement of the counter-bore 14 about the axis of the nut enables the counter-bore 14 to pilot the tip of the bolt 18 toward the threaded bore 12 in the nut body 11, thereby facilitating engagement of the internal threads of the nut with the bolt 18. The self-alignment between the nut and the bolt can, thus, be performed, thanks to the eccentric counter-bore in the nut.

Although the description has been made on the function of the self-aligning nut, it will be appreciated that the self-aligning bolt as described with reference to FIGS. 1 and 2, also functions in the same manner as in the nut.

It will be noted that the present invention provides a self-aligning bolt or nut which can easily smoothly engage the nut or bolt even if there is a significant misalignment between the bolt and nut.

We claim:

1. A self-aligning bolt, comprising:
    an externally threaded shank having a central axis and a root diameter; and
    a threadless eccentric pilot tip connected to the shank, said tip having a central axis offset from the axis of the shank, having a first threadless section of constant diameter less than the root diameter of the shank, having a periphery defined by said diameter disposed internally tangent to a circle defined by said root diameter, having a second threadless section which is tapered and extends between said shank and first section, and further having a chamfer on an end displaced from said threaded shank.

2. An integral self-aligning nut, comprising:
    a nut body having a top side and a seating side;
    a central internal threaded bore having a central axis and a root diameter; and
    a threadless eccentric counter bore disposed on the seating side of the nut and having a diameter and a central axis offset from the axis of the threaded bore, wherein the diameter of the counter bore defines a periphery externally tangent with a circle defined by the root diameter of the threaded bore.

3. A self-aligning nut according to claim 2, further comprising a chamfer formed in the counter-bore adjacent the seating side of the nut.

* * * * *